United States Patent
Warner

(12) 
(10) Patent No.: US 10,239,576 B2
(45) Date of Patent: Mar. 26, 2019

(54) FRONT WHEEL DRIVE BICYCLE ASSEMBLY

(71) Applicant: Mike Warner, Davis, OK (US)

(72) Inventor: Mike Warner, Davis, OK (US)

( * ) Notice: Subject to any disclaimer, the term of this patent is extended or adjusted under 35 U.S.C. 154(b) by 74 days.

(21) Appl. No.: 15/468,249

(22) Filed: Mar. 24, 2017

(65) Prior Publication Data
US 2018/0273133 A1   Sep. 27, 2018

(51) Int. Cl.
| | |
|---|---|
| *B62K 21/18* | (2006.01) |
| *B62K 3/02* | (2006.01) |
| *B62M 1/36* | (2013.01) |
| *B62M 9/10* | (2006.01) |
| *B62K 21/02* | (2006.01) |
| *B62K 21/12* | (2006.01) |
| *B62J 1/00* | (2006.01) |

(52) U.S. Cl.
CPC ............. *B62K 21/18* (2013.01); *B62J 1/00* (2013.01); *B62K 3/02* (2013.01); *B62K 21/02* (2013.01); *B62K 21/12* (2013.01); *B62M 1/36* (2013.01); *B62M 9/10* (2013.01)

(58) Field of Classification Search
CPC ...................................................... B62K 21/00
See application file for complete search history.

(56) References Cited

U.S. PATENT DOCUMENTS

| | | | | |
|---|---|---|---|---|
| 522,908 A * | 7/1894 | Libbey | ............. | B62J 1/14 280/202 |
| 2,182,345 A * | 12/1939 | Mieher | ............. | B62K 7/00 280/238 |
| D265,080 S | 6/1982 | Olsson et al. | | |
| 4,506,902 A | 3/1985 | Maebe | | |
| 4,650,023 A | 3/1987 | Matsuda et al. | | |
| 4,925,202 A * | 5/1990 | Barker | ............. | B60T 1/065 280/261 |
| 5,351,979 A * | 10/1994 | Langen | ............. | B62K 21/00 280/254 |
| 5,485,893 A * | 1/1996 | Summers | ............. | B62K 21/00 180/219 |
| 6,102,420 A * | 8/2000 | Hoeksta | ............. | B62K 21/00 280/267 |
| 6,588,786 B2 * | 7/2003 | Efflandt, Sr. | ............. | B62M 1/36 280/261 |
| 7,025,366 B2 | 4/2006 | Killian | | |

(Continued)

FOREIGN PATENT DOCUMENTS

WO    WO2005063557    7/2005

*Primary Examiner* — Kevin Hurley

(57) ABSTRACT

A front wheel drive bicycle assembly includes a frame that may be mounted for riding. A front wheel is rotatably coupled to a front end of the frame and the front wheel rolls along a support surface. A pedal unit is rotatably coupled to the frame and the pedal unit is selectively pedaled. The pedal unit is in mechanical communication with the front wheel to rotate the front wheel thereby urging the frame along the support surface. A rear wheel is rotatably coupled to a back end of the frame and the rear wheel rolls along the support surface. Moreover, the rear wheel is selectively rotated about a vertical axis for steering. A steering unit is movably coupled to the frame and the steering unit is in mechanical communication with the rear wheel. In this way the steering unit selectively rotates the rear wheel about the vertical axis for steering.

14 Claims, 4 Drawing Sheets

(56) References Cited

U.S. PATENT DOCUMENTS

| | | |
|---|---|---|
| 7,121,567 B1 | 10/2006 | Gaea |
| 7,871,095 B2 | 1/2011 | Killian |
| 8,100,425 B2 | 1/2012 | Raynor |
| 9,061,724 B2 * | 6/2015 | James .................... B62M 1/36 |
| 2003/0042701 A1 * | 3/2003 | Chen ...................... B62K 3/10 |
| | | 280/270 |
| 2006/0226628 A1 * | 10/2006 | Lindsay ................ A61G 5/023 |
| | | 280/250 |

* cited by examiner

FRONT WHEEL DRIVE BICYCLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to bicycle devices and more particularly pertains to a new bicycle device for steering a rear wheel of a bicycle.

BRIEF SUMMARY OF THE INVENTION

An embodiment of the disclosure meets the needs presented above by generally comprising a frame that may be mounted for riding. The frame has a front end and a back end. A front wheel is rotatably coupled to the front end of the frame and the front wheel rolls along a support surface. A pedal unit is rotatably coupled to the frame and the pedal unit is selectively pedaled. The pedal unit is in mechanical communication with the front wheel to rotate the front wheel thereby urging the frame along the support surface. A rear wheel is rotatably coupled to the back end of the frame and the rear wheel rolls along the support surface. Moreover, the rear wheel is selectively rotated about a vertical axis for steering. A steering unit is movably coupled to the frame and the steering unit is in mechanical communication with the rear wheel. In this way the steering unit selectively rotates the rear wheel about the vertical axis for steering.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
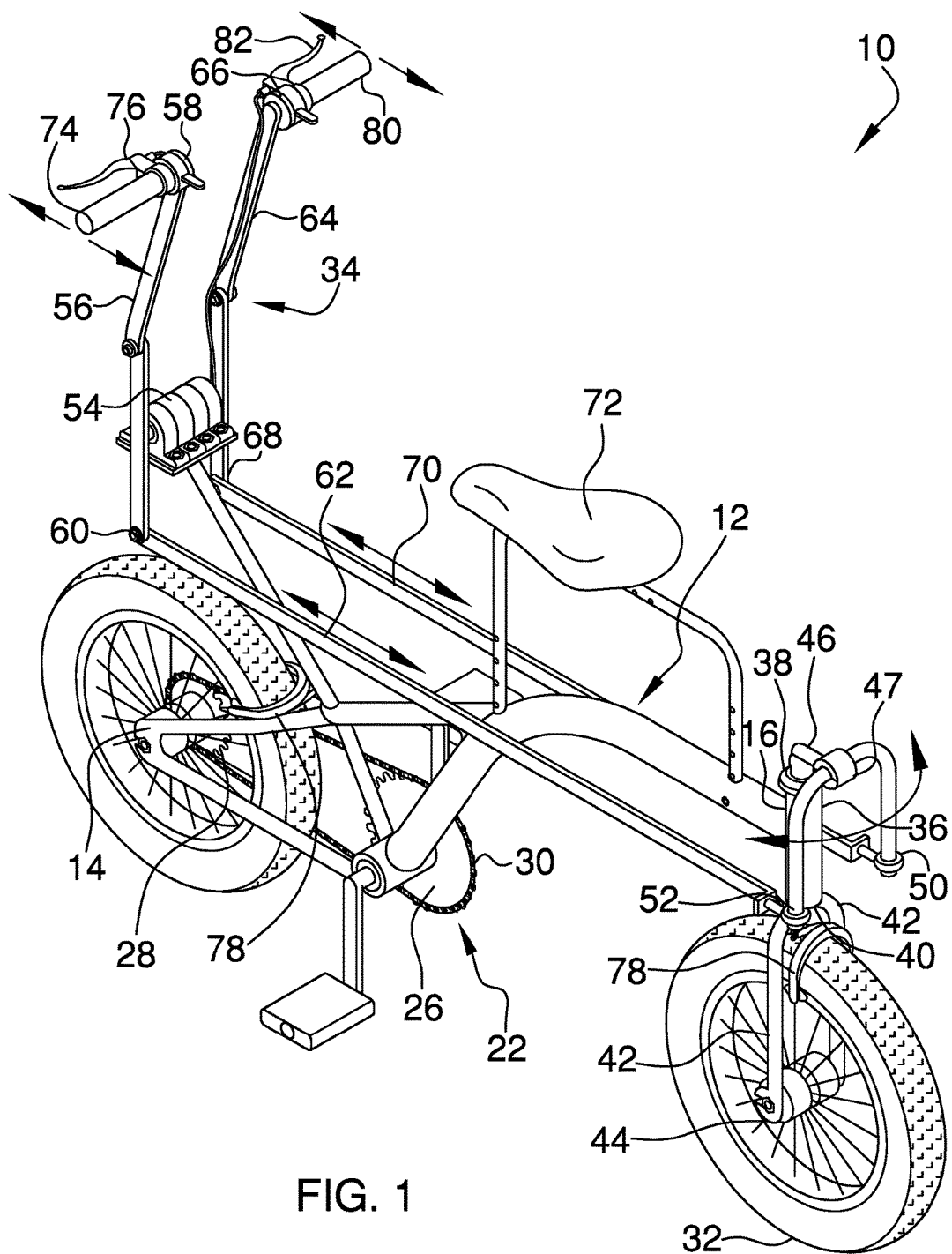
FIG. 1 is a back perspective view of a front wheel drive bicycle assembly according to an embodiment of the disclosure.
Figure 2:
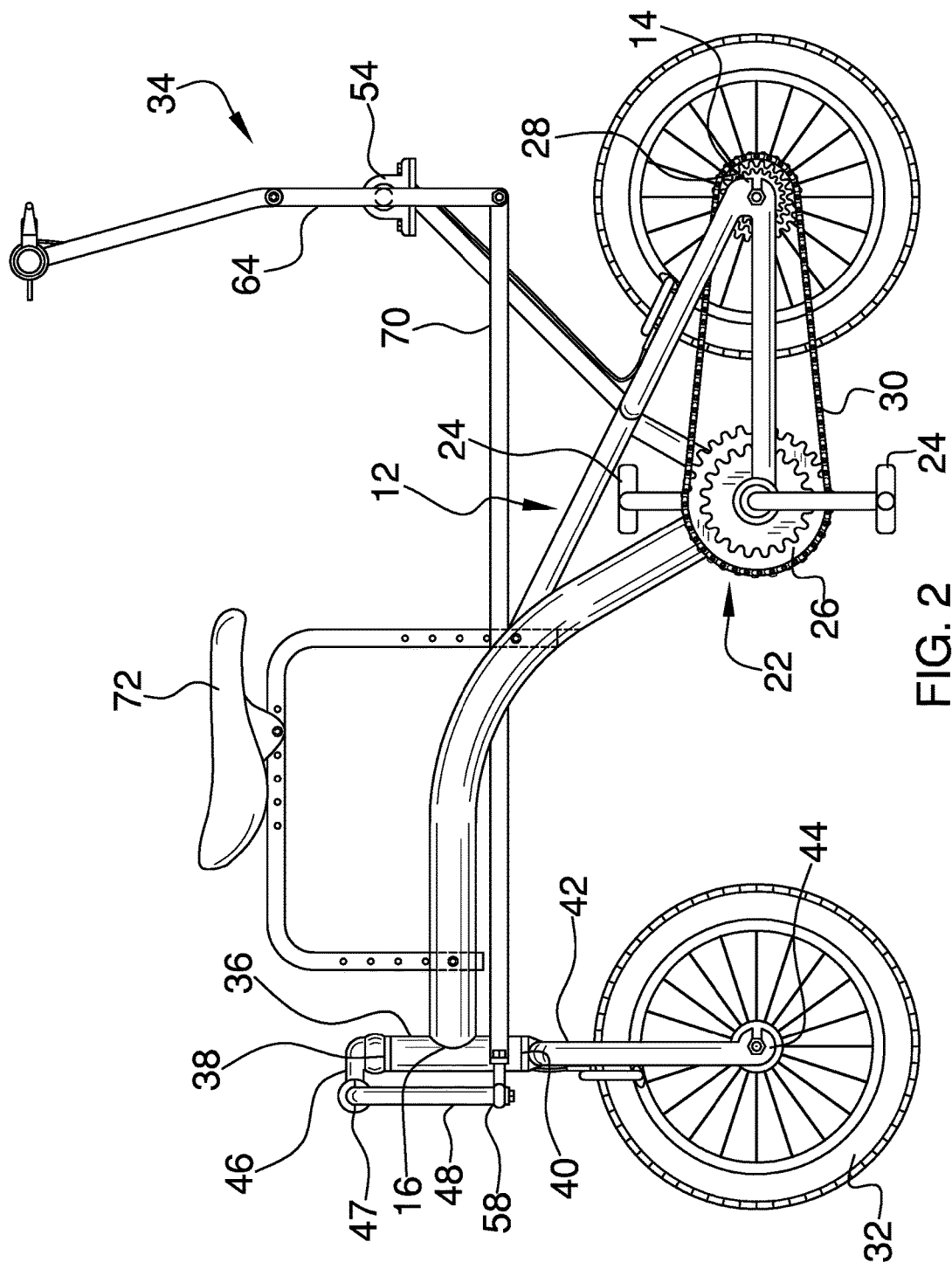
FIG. 2 is a right side view of an embodiment of the disclosure.
Figure 3:
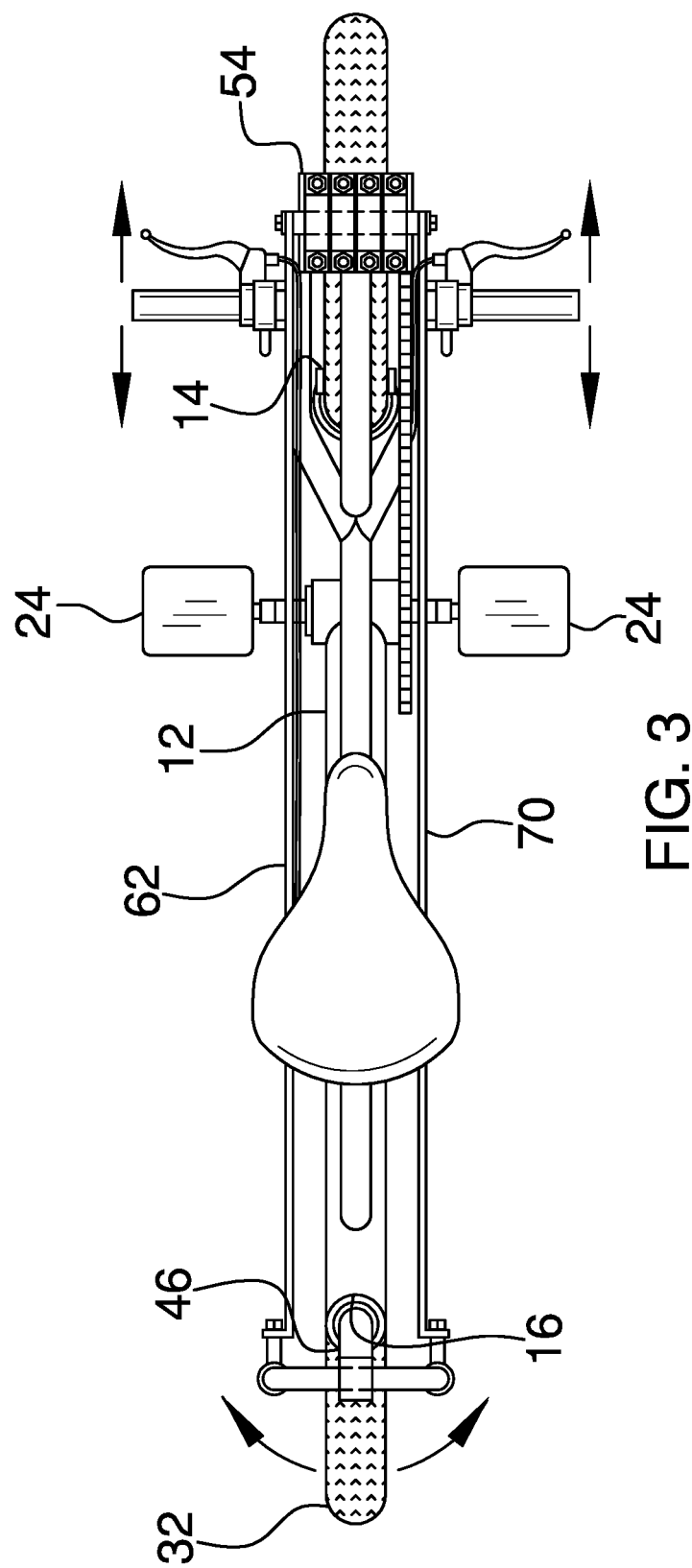
FIG. 3 is a top view of an embodiment of the disclosure.
Figure 4:
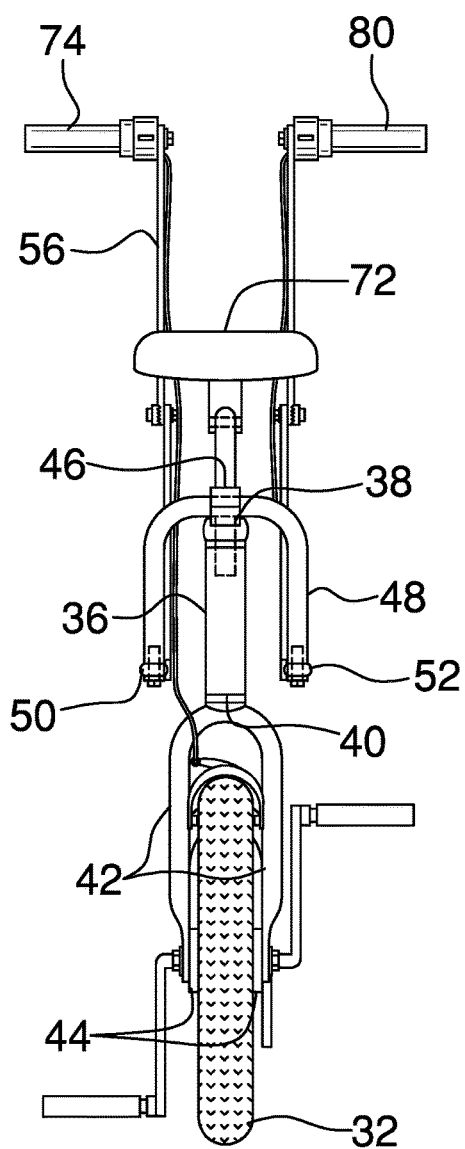
FIG. 4 is a back view of an embodiment of the disclosure.
Figure 5:
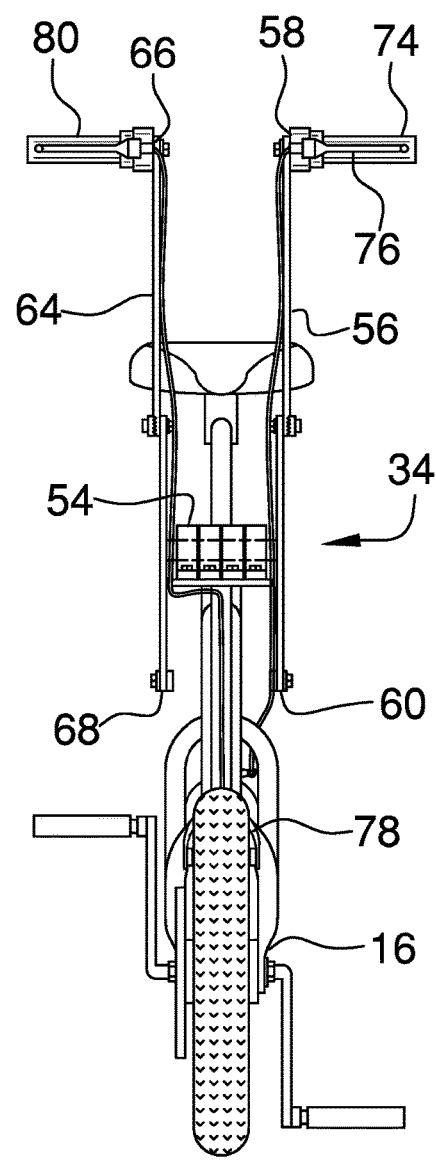
FIG. 5 is a front view of an embodiment of the disclosure.

With reference now to the drawings, and in particular to FIGS. 1 through 5 thereof, a new bicycle device embodying the principles and concepts of an embodiment of the disclosure and generally designated by the reference numeral 10 will be described.

As best illustrated in FIGS. 1 through 5, the front wheel drive bicycle assembly 10 generally comprises a frame 12 that is selectively mounted for riding. The frame 12 has a front end 14 and a back end 16 and the frame 12 may be a bicycle frame or the like. A front wheel 18 is rotatably coupled to the front end 14 of the frame 12 to roll along a support surface 20.

A pedal unit 22 is rotatably coupled to the frame 12 and the pedal unit 22 selectively pedaled in the convention of riding a bicycle. The pedal unit 22 is in mechanical communication with the front wheel 18 such that the pedal unit 22 selectively rotates the front wheel 18. In this way the pedal unit 22 urges the frame 12 along the support surface 20.

The pedal unit 22 comprises a pair of pedals 24 and each of the pedals 24 is rotatably coupled to the frame 12. The pedals 24 may be bicycle pedals of any conventional design. A drive gear 26 is coupled to the pedals 24 such that the pedals 24 rotate the drive gear 26. A plurality of driven gears 28 is provided and each of the driven gears 28 is coupled to the front wheel 18. A chain 30 is positioned around the drive gear 26 and a selected one of the driven gears 28 such that the drive gear 26 rotates the front wheel 18. Each of the driven gears 28 and the drive gear 26 may be multi gear bicycle chain drive of any conventional design.

A rear wheel 32 is rotatably coupled to the back end 16 of the frame 12 to roll along the support surface 20. The rear wheel 32 is selectively rotated about a vertical axis for steering. A steering unit 34 is movably coupled to the frame 12 and the steering unit 34 is selectively manipulated for steering. The steering unit 34 is in mechanical communication with the rear wheel 32. Moreover, the steering unit 34 selectively rotates the rear wheel 32 about the vertical axis for steering.

The steering unit 34 comprises a first bearing 36 that is coupled to the back end 16 of the frame 12. The first bearing 36 has a top end 38 and a bottom end 40 and the first bearing 36 is vertically oriented. A pair of forks 42 is provided and the forks 42 extend through the first bearing 36 such that the forks 42 are selectively rotated about the vertical axis. Each of the forks 42 has a distal end 44 with respect to the bottom end 40 of the first bearing 36. The rear wheel 32 is rotatably coupled to the distal end 44 corresponding to each of the forks 42.

A yoke 46 is coupled to the forks 42 and the yoke 46 is positioned on the top end 38 of the first bearing 36. The yoke 46 extends forwardly from the first bearing 36 to define a distal end 47 of the yoke 46 with respect to the first bearing 36. A steering member 48 is positioned on the distal end 47 of the yoke 46 and is oriented transverse with respect to the first bearing 36. The steering member 48 has a first end 50 and a second end 52 and the steering member is curved between the first end 50 and the second end 52. Thus, each of the first 50 and second 52 ends are directed downwardly from the yoke 46.

A second bearing 54 is coupled to the front end 14 of the frame 12 and the second bearing 54 is horizontally oriented. A first lever 56 is pivotally coupled to the second bearing 54 and the first lever 56 is vertically oriented. The first lever 56 is selectively urged between a forward position and a rearward position for steering. The first lever 56 has an upper end 58 and lower end 60. A first rod 62 is pivotally coupled between the lower end of the first lever 56 and the first end of the steering member 48. The first rod 62 urges the forks 42 to rotate about the vertical axis when the first lever 56 is manipulated.

A second lever 64 is pivotally coupled to the second bearing 54 and the second lever 64 is vertically oriented. The second lever 64 is selectively urged between a forward position and a rearward position for steering. The second lever 64 is positioned on an opposite end of the second bearing 54 with respect to the first lever 56. The second lever 64 has an upper end 66 and lower end 68. A second rod 70 is pivotally coupled between the lower end 68 of the second lever 64 and the second end 52 of the steering member 48. The second rod 70 urges the forks 42 to rotate about the vertical axis when the second lever 64 is manipulated. A seat 72 is adjustably coupled to and extends upwardly from the frame 12 and the seat 72 is sat upon. The seat 72 is centrally positioned on the frame 12.

A first grip 74 is coupled to and extends laterally away from the upper end 58 of the first lever 56 and the first grip 74 is gripped for steering. A first brake handle 76 is movably coupled to the first grip 74 and the first brake handle 76 is mechanically coupled to a bicycle braking system 78. A second grip 80 is coupled to and extends laterally away from the upper end 66 of the second lever 64 and the second grip 80 is gripped for steering. A second brake handle 82 is movably coupled to the second grip 80 and the second brake handle 82 is mechanically coupled to the bicycle braking system 78. Additionally, a pair of gear shift levers may each be movably coupled to an associated one of the first 74 and second 80 grips. Each of the gear shift levers may be in mechanical communication with an associated one of the drive gear 26 and the driven gears 28.

In use, the frame 12 is mounted and each of the pedals 24 is manipulated to urge the frame 12 along the support surface 20. Each of the first 74 and second 80 grips is manipulated for steering. In this way the frame 12 is ridden in the convention of a bicycle. The first lever 56 is urged into the forward position and the second lever 64 is urged into the rearward position to make a right turn. The first lever 56 is urged into the rearward position and the second lever 64 is urged into the forward position to make a left turn. The first lever 56 is aligned with the second lever 64 to travel in a straight line. Steering the rear wheel 32 facilitates a zero turning radius thereby enhancing the experience of riding a bicycle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A front wheel drive bicycle assembly having rear wheel steering, said assembly comprising:
    a frame being configured to be mounted for riding, said frame having a front end and a back end;
    a front wheel being rotatably coupled to said front end of said frame wherein said front wheel is configured to roll along a support surface;
    a pedal unit being rotatably coupled to said frame wherein said pedal unit is configured to be pedaled, said pedal unit being in mechanical communication with said front wheel such that said pedal unit selectively rotates said front wheel wherein said pedal unit is configured to urge said frame along the support surface;
    a rear wheel being rotatably coupled to said back end of said frame wherein said rear wheel is configured to roll along the support surface, said rear wheel being selectively rotated about a vertical axis for steering; and
    a steering unit being movably coupled to said frame wherein said steering unit is configured to be manipulated, said steering unit being in mechanical communication with said rear wheel, said steering unit selectively rotating said rear wheel about said vertical axis for steering, said steering unit comprising
        a first bearing being coupled to said back end of said frame,
        a second bearing being coupled to said front end of said frame, said second bearing being horizontally oriented, and
        a first lever being pivotally coupled to said second bearing, said first lever being vertically oriented wherein said first lever is configured to be selectively urged between a forward position and a rearward position, said first lever having an upper end and lower end.

2. The assembly according to claim 1, wherein said pedal unit comprises a pair of pedals, each of said pedals being rotatably coupled to said frame.

3. The assembly according to claim 2, further comprising a drive gear being coupled to said pedals such that said pedals rotate said drive gear.

4. The assembly according to claim 1, further comprising a plurality of driven gears, each of said driven gears being coupled to said front wheel.

5. The assembly according to claim 4, further comprising:
   a drive gear; and
   a chain being positioned around said drive gear and a selected one of said driven gears such that said drive gear rotates said front wheel.

6. The assembly according to claim 1, further comprising said first bearing having a top end and a bottom end, said first bearing being vertically oriented.

7. The assembly according to claim 6, further comprising a pair of forks, said forks extending through said first bearing such that said forks are selectively rotated about said vertical axis, each of said forks having a distal end with respect to said bottom end of said first bearing, said rear wheel being rotatably coupled to said distal end corresponding to each of said forks.

8. The assembly according to claim 7, further comprising a yoke being coupled to said forks, said yoke being positioned on said top end of said first bearing, said yoke extending forwardly from said first bearing to define a distal end of said yoke with respect to said first bearing.

9. The assembly according to claim 8, wherein said yoke has a steering member being positioned on said distal end of said yoke and oriented transverse with respect to said first bearing, said steering member having a first end and a second end.

10. The assembly according to claim 1, said steering unit further comprising:
    a steering member having a first end;
    a pair of forks being selectively rotated about a vertical axis; and
    a first rod being pivotally coupled between said lower end of said first lever and said first end of said steering member, said first rod urging said forks to rotate about said vertical axis when said first lever is manipulated.

11. The assembly according to claim 1, said steering unit further comprising a second lever being pivotally coupled to said second bearing, said second lever being vertically oriented wherein said second lever is configured to be selectively urged between a forward position and a rearward position, said second lever having an upper end and lower end.

12. The assembly according to claim 11, further comprising:
    a steering member having a first end and a second end;
    a pair of forks being selectively rotated about a vertical axis;
    a first rod being pivotally coupled between a lower end of said first lever and said first end of said steering member; and
    a second rod being pivotally coupled between said lower end of said second lever and said second end of said steering member, said second rod urging said forks to rotate about said vertical axis when said second lever is manipulated.

13. The assembly according to claim 1, further comprising a seat being coupled to and extending upwardly from said frame wherein said seat is configured to be sat upon, said seat being centrally positioned on said frame.

14. A front wheel drive bicycle assembly having rear wheel steering, said assembly comprising:
    a frame being configured to be mounted for riding, said frame having a front end and a back end;
    a front wheel being rotatably coupled to said front end of said frame wherein said front wheel is configured to roll along a support surface;
    a pedal unit being rotatably coupled to said frame wherein said pedal unit is configured to be pedaled, said pedal unit being in mechanical communication with said front wheel such that said pedal unit selectively rotates said front wheel wherein said pedal unit is configured to urge said frame along the support surface, said pedal unit comprising:
       a pair of pedals, each of said pedals being rotatably coupled to said frame,
       a drive gear being coupled to said pedals such that said pedals rotate said drive gear,
       a plurality of driven gears, each of said driven gears being coupled to said front wheel, and
       a chain being positioned around said drive gear and a selected one of said driven gears such that said drive gear rotates said front wheel;
    a rear wheel being rotatably coupled to said back end of said frame wherein said rear wheel is configured to roll along the support surface, said rear wheel being selectively rotated about a vertical axis for steering;
    a steering unit being movably coupled to said frame wherein said steering unit is configured to be manipulated, said steering unit being in mechanical communication with said rear wheel, said steering unit selectively rotating said rear wheel about said vertical axis for steering, said steering unit comprising:
       a first bearing being coupled to said back end of said frame, said first bearing having a top end and a bottom end, said first bearing being vertically oriented,
       a pair of forks, said forks extending through said first bearing such that said forks are selectively rotated about said vertical axis, each of said forks having a distal end with respect to said bottom end of said first bearing, said rear wheel being rotatably coupled to said distal end corresponding to each of said forks,
       a yoke being coupled to said forks, said yoke being positioned on said top end of said first bearing, said yoke extending forwardly from said first bearing to define a distal end of said yoke with respect to said first bearing, said yoke having a steering member being positioned on said distal end of said yoke and oriented transverse with respect to said first bearing, said steering member having a first end and a second end,
       a second bearing being coupled to said front end of said frame, said second bearing being horizontally oriented,
       a first lever being pivotally coupled to said second bearing, said first lever being vertically oriented wherein said first lever is configured to be selectively urged between a forward position and a rearward position, said first lever having an upper end and lower end,
       a first rod being pivotally coupled between said lower end of said first lever and said first end of said steering member, said first rod urging said forks to rotate about said vertical axis when said first lever is manipulated, a second lever being pivotally coupled to said second bearing, said second lever being vertically oriented wherein said second lever is configured to be selectively urged between a forward position and a rearward position, said second lever having an upper end and lower end, a second rod being pivotally coupled between said lower end of said second lever and said second end of said steering member, said second rod urging said forks to rotate about said vertical axis when said second lever is manipulated; and a seat being coupled to and extending upwardly from said frame wherein said seat is configured to be sat upon, said seat being centrally positioned on said frame.

* * * * *